Oct. 16, 1934.　　　A. W. HAYDON　　　1,977,186
ELECTRIC MOTOR
Original Filed Sept. 16, 1931
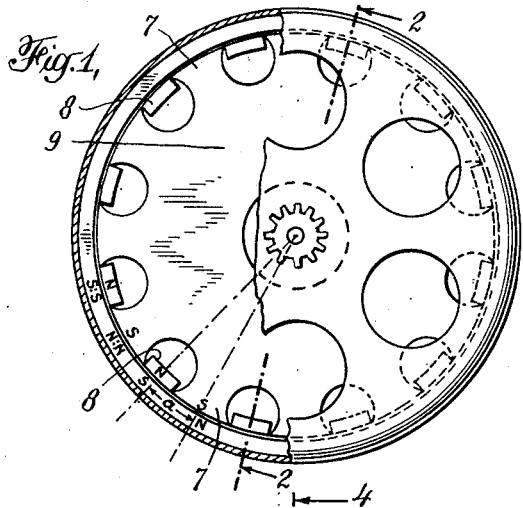
Fig. 1,
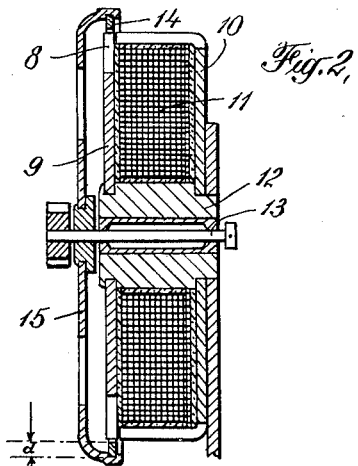
Fig. 2,
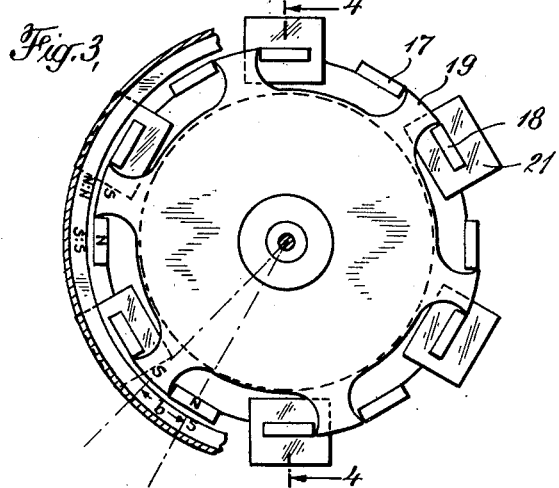
Fig. 3,
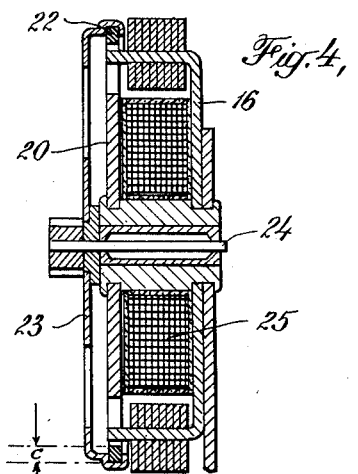
Fig. 4,
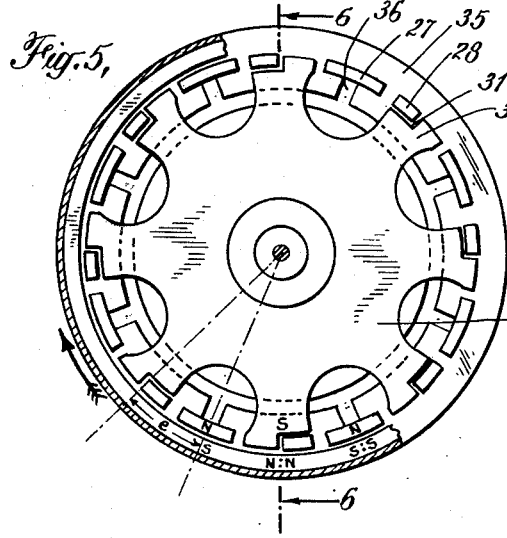
Fig. 5,
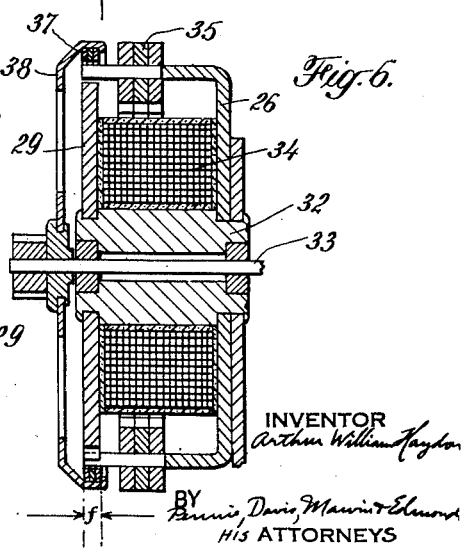
Fig. 6.
INVENTOR
Arthur William Haydon
BY
His ATTORNEYS Patented Oct. 16, 1934

1,977,186

UNITED STATES PATENT OFFICE 1,977,186

ELECTRIC MOTOR

Arthur William Haydon, Waterbury, Conn.

Continuation of application Serial No. 563,047, September 16, 1931. This application November 11, 1933, Serial No. 697,591

9 Claims. (Cl. 172—275)

This invention relates to electric motors and more particularly to single phase synchronous motors of a type suitable for use in operating clock mechanisms and other timing devices.

This application is a continuation of my copending application, Serial No. 563,047, filed September 16, 1931, which issued as Patent No. 1,935,208, dated November 14, 1933.

For many purposes it is desirable to provide a single phase motor capable of developing considerable starting torque, and also capable of operating at a constant speed determined by the frequency of the alternating current supplied to the motor.

One of the objects of my invention is to provide an improved alternating current motor of the hysteresis type incorporating an armature member which is so designed and constructed that the motor is capable of developing strong torque at both synchronous and sub-synchronous speed. The invention is applicable to both self-starting and non-self-starting hysteresis motors.

My improved motor comprises a multi-polar field having a plurality of poles which are of opposite sign or polarity at any given instant, and an armature element, preferably the rotor, formed of a material having a high hysteresis coefficient, such as hardened steel. The field structure comprises pole pieces arranged in substantial circumferential alignment, and in accordance with my invention, the armature comprises a ring of limited cross section disposed adjacent the pole pieces of the field structure and relatively rotatable with respect to the field structure. In accordance with my present invention, the armature ring is so designed that its greatest cross sectional dimension is less than the distance between the centers of the field poles of opposite instantaneous polarity, and I prefer that this greatest cross sectional armature dimension should be less than one-half of the center-to-center distance between opposite field poles. I prefer to employ an armature ring of sufficient cross section so that the maximum magnetic flux density produced in the armature by the field approaches but is less than that producing a condition of saturation in the armature metal.

My invention is applicable to motors employing field structures which produce alternating or stationary axis magnetic fields as well as to those whose field structures produce shifting or rotating axis magnetic fields. In either case, the motor comprises a multi-polar field having spaced poles which are of opposite sign at any given instant, together with an armature formed of material having a high hysteresis coefficient, such as hardened steel. The motor is primarily intended for use with single phase alternating current, the current being supplied to a primary winding so as to produce north and south poles with the polarity of each pole reversing in synchronism with the supply current. The rotor element is arranged in close proximity to the primary pole pieces so that at any instant the magnetization of any one field pole produces a magnetic pole of opposite sign in the adjacent portion of the rotor. An instant later, the polarity of the field pole will be changed due to the reversal of the primary current, but due to the high hysteresis coefficient of the armature, the induced pole in the armature will not immediately change, and accordingly, the armature pole will be repelled by the adjacent field pole, thereby creating a torque tending to rotate the armature, which is also the rotor element. The armature will thus continue to rotate in the direction of its initial impetus, which may be produced either manually or by a rotating or shifting magnetic field, as hereinafter more fully explained.

Considering the motor briefly described above, the amount of torque developed thereby both during acceleration and when operating at synchronous speed depends on the strength of the permanent magnetic poles created in the armature structure by the field poles. This strength of the permanent magnets is partly dependent upon the magnetic constants of the armature material employed, and consequently, the armature is made up of material having high values of remanence and coercive force. These constants are determined by the hysteresis coefficient of the material, and accordingly, a steel having a high hysteresis coefficient is chosen for the armature.

I have found that, using armature metal of a given high hysteresis coefficient, the strength of the permanent magnets produced therein by the field poles, and consequently, the amount of torque developed, can be materially increased if the armature is properly shaped and proportioned. Thus I have discovered that if the armature is designed in the form of a continuous ring having cross sectional dimensions lying between certain limits, a desirable high torque will be developed. As stated above, the greatest cross sectional dimension should be less than the distance between the centers of adjacent field poles of opposite instantaneous polarity, and in general, the smaller this maximum cross sectional dimension with respect to the distance between the centers of opposite field poles, the greater is the torque produced. The low limit of the cross section of my improved armature is fixed by the saturation point of the armature metal used, that is, the armature must be of sufficient cross section so that under conditions of maximum flux produced by the field, the flux density in the armature does not exceed the saturation value.

The torque obtainable with my improved ring type armature is considerably greater for a given field strength than that obtainable with the disc and cup type armatures heretofore employed. Although the invention is in no way limited to or dependent upon the correctness thereof, I believe that the improvement obtained rests upon the following theory. A permanent magnet, such as the magnets produced or created in an armature by the field flux of a motor, exerts a demagnetizing effect upon itself. Thus the poles of the permanent magnet produce a magnetic field in some portions of the magnet which field is in opposition to the main flux produced by the magnet. This demagnetizing effect increases very rapidly as the maximum cross sectional dimension of the magnet increases, since with an increase in such dimension, the path for lines of magnetic force in opposition to the main flux is augmented. In armatures of the disc or cup type, the self demagnetizing effect is great, due to the fact that each permanent magnet produced therein has a dimension transversely of its magnetic axis which is at least as great as its axial length, and accordingly has a considerable path for opposing or demagnetizing lines of force. I have found that if the greatest cross sectional dimension of a permanent magnet be made smaller than its axial length, the demagnetizing effect may be materially reduced, and within certain limits, demagnetization is reduced in proportion to the increase of the ratio of axial length of the magnet over maximum transverse dimension. By forming my improved armature in the shape of a ring of limited cross sectional dimensions, I am able to keep the maximum transverse dimension of each permanent magnet produced in the armature considerably below the axial length of such permanent magnet thereby reducing the demagnetizing effect to a large extent and increasing the strength of the permanent magnetism produced with a resultant increase in torque. The minimum cross sectional dimensions of my improved armature are limited by the saturation point of the particular material used to form the armature. Thus the cross section of the armature should be sufficient so that the maximum flux density produced therein by the field is short of the saturation value. If the flux density in the armature exceeds the saturation value to any considerable extent, the hysteresis effect or coercive force decreases rapidly with a corresponding decrease in motor torque.

The invention will be best understood by reference to the accompanying drawing, in which I have illustrated certain embodiments thereof. In the drawing;

Figure 1 is an elevation of a motor embodying the invention with certain parts broken away to show the armature construction;

Figure 2 is a sectional view of the motor shown in Figure 1, taken along the line 2—2 of Figure 1;

Figure 3 is an elevation of a modified form of motor embodying the invention;

Figure 4 is a sectional view of the motor shown in Figure 3, taken along the line 4—4 of Figure 3;

Figure 5 is an elevation of a third form of motor embodying the invention; and

Figure 6 is a sectional view of the motor of Figure 5, taken along the line 6—6 of Figure 5.

As stated above, my invention may be applied to motors having field structures which produce either stationary axis alternating magnetic fields or to motors having field structures which produce shifting or rotating axis magnetic fields. I have accordingly illustrated the invention as applied to both these types of motors.

The motor illustrated in Figures 1 and 2 is of the stationary axis magnetic field type, and is generally known as a non-self-starting motor. As shown, the field structure of this motor comprises two sets of field poles 7 and 8 carried respectively by separate field casing sections 9 and 10. The casing section 9 comprises a disc having radial projections, the ends of which constitute the pole pieces 7. The casing section 10 comprises a disc having lateral projections, the ends of which constitute the pole pieces 8. The pole pieces 7 and 8 are arranged as shown in substantial circumferential alignment about the periphery of the field structure. A single coil of insulated magnet wire 11 is enclosed between the two casing sections 9 and 10 of the field casing. Single phase alternating current may be supplied to this coil from any suitable source. The radial portions of the casing sections are located on opposite sides of the coil and accordingly, at any given instant, these two sections are magnetized in such a way that they are of opposite polarity. Accordingly, the alternate pole pieces 7 and 8 are of opposite polarity at any given instant. The casing sections 9 and 10 are connected by means of a central core 12 and the shaft 13 of the motor is preferably journaled in a central opening through this core, as shown in Figure 2.

Referring now more particularly to the armature element of the motor, the armature proper comprises a ring 14 formed of a material having a high hysteresis coefficient, such as hardened steel. The armature is carried by a suitable spider or rotor member 15 fixed to the shaft 13. The rotor member 15 may be formed of any suitable non-magnetic material, such as aluminum. As shown in the drawing, the armature ring 14 is so disposed that it surrounds the pole pieces 7 and 8 of the field structure and lies closely adjacent thereto.

The armature ring may be of any suitable cross section, and as shown, this section may be rectangular with the greatest cross sectional dimension $d$ extending radially of the ring. In accordance with my invention this dimension $d$ is considerably less than the distance $a$ between the centers of adjacent field poles 7 and 8 of opposite instantaneous polarity. In fact, in the illustrated embodiment, the maximum cross sectional dimension $d$ of the armature ring 14 is less than one-half the inter-polar distance $a$ of the field structure. With this arrangement, when the field coil 11 is energized, the permanent magnets produced in the armature are of considerably greater length than breadth and accordingly have a low self-demagnetizing force. As illustrated in Fig. 1, at the instant that the poles 7 are south magnetic poles and the poles 8 are north magnetic poles, a plurality of aligned permanent magnets are produced in the armature ring, each such permanent magnet extending from the center of a south field pole 7 to the center of an adjacent north field pole 8. Thus the length of each permanent magnet produced in the armature is equal to the distance between the centers of adjacent field poles of opposite instantaneous polarity and the maximum breadth of such magnet is the maximum cross sectional dimension $d$ of the armature ring.

In the operation of the motor, the rotor is turned by hand or some other extraneous force and the south poles created in the armature will move toward the south poles of the pole pieces 7. If the motor is rotating at a speed below synchronous speed the pole pieces 7 will become north poles before the south poles in the armature come opposite the pole pieces 7 and at the same time the pole pieces 8 will be changed to south poles which act to repel the south poles of the armature at the same time that they are being attracted by the north poles of the pole pieces 7. This produces a torque tending to accelerate the rotation of the armature and this torque exists because of the fact that the armature is made of a material having a high hysteresis co-efficient which makes the armature resist the tendency of the field poles to suddenly reverse the polarity of those portions of the armature here under consideration. In other words, the permanent or residual magnetism in the armature tends to preserve the polarity of the armature and to this extent a couple is produced tending to accelerate the rotation of the armature. The low self-demagnetizing effect of the armature resulting from the above described proportioning of its greatest cross sectional dimension insures a strong residual or permanent magnetism therein which increases the torque produced. If the armature is rotating at a relatively low speed, the polarity of any given section of the armature will be changed, but this occurs at a slow rate due to the high hysteresis co-efficient of the armature metal and to low self-demagnetizing effect of the armature, and the result is to produce a field in the armature lagging behind the primary field to an extent such that the reaction of the two fields produces a positive torque. After synchronous speed is reached, each portion of the armature possesses a fixed polarity. The motor then operates as a synchronous motor and the speed of rotation is that determined by the frequency of the supply current and the number of field poles. The low self-demagnetizing effect of the armature results in a strong permanent magnetism which in turn produces a high torque during synchronous operation.

Referring now to Figs. 3 and 4, the motor there disclosed has a field structure capable of producing a rotating axis magnetic field. The field casing section 16 has a plurality of lateral projections, the outer ends of which form the pole pieces 17 and 18, and the pole pieces 19 disposed between the pole pieces 17 and 18, are formed by radial projections on the opposite casing section 20. Shading or phase shifting means such as the conductive disks 21 surround each of the poles 18 and cause the flux of these poles to lag approximately 90 degrees in time phase relation behind the flux in the unshaded poles 17.

The armature ring 22 of the motor is rotatably carried adjacent the poles 17, 18 and 19 by the rotor member 23 fixed to the central shaft 24. As shown, this armature ring is rectangular and has its greatest cross sectional dimension extending radially thereof. In accordance with the invention, the greatest cross sectional dimension $c$ of the rotor ring 22 is considerably less than the distance $b$ between the centers of adjacent field poles 17 and 19 of opposite instantaneous polarity. In this manner, the self-demagnetizing effect of the permanent magnets produced in the armature is maintained at a low value and a high motor torque is obtained.

When the field coil 25 of the motor shown in Figs. 3 and 4 is energized with alternating current, the poles 18 and 19 produce a shifting or rotating axis magnetic field which starts and accelerates the motor. Thus the rotating magnetic polarity produced by the field poles 18 and 19 produces corresponding opposite poles in the armature ring 22, and these armature poles persist due to the high hysteresis co-efficient of the armature metal and to the low self-demagnetizing effect of the armature. Thus the residual magnetization in the armature tends to preserve the magnetic pattern of the armature and to this extent a couple is produced between the rotating field polarity and the lagging armature polarity, and this couple rotates the armature and causes its acceleration. When the motor has accelerated to the synchronous speed determined by the unshaded opposite poles 17 and 18, the polarity of the armature becomes fixed and the torque developed at this speed is high due to the low self-demagnetizing effect of the armature which results from the above explained proportioning of its dimensions.

In Figs. 5 and 6, I have illustrated my invention as applied to a different type of self-starting hysteresis motor. This motor has a field member comprising a casing section 26 of cup-like form having lateral extensions forming the pole pieces 27 and 28. Another casing section comprising a flat disk 29 has radial extensions which form the pole pieces 30. Each pole piece 30 has a recess 31 formed therein into which pole piece 28 of the casing section 26 extends. The casing sections 27 and 29 are connected by a central core 32 and the motor shaft 33 is journaled in a central opening in this core as shown. The field coil 34 is disposed about the core 32 between the casing sections 26 and 29. Suitable shading or phase shifting means are disposed about poles 28, and as shown, this means may comprise a plurality of super-imposed conductive rings 35 each surrounding each of the poles 28, but split as shown at 36 to prevent the formation of conductive paths around the poles 27.

The armature of the motor shown in Figs. 5 and 6 comprises a ring 37 of high hysteresis coefficient metal, rotatably carried adjacent the field poles by a rotor member 38 fixed to the shaft 33. In accordance with the invention, the maximum cross sectional dimension of the armature ring 37, which in this case is its axial dimension $f$, is less than the distance $e$ between the centers of adjacent field poles 27 and 30 of opposite instantaneous polarity. I have found that the efficiency and torque developed by the motor can be materially increased by forming the armature ring 37 of a plurality of super-imposed rings, and a subdivided or laminated armature of this type has been illustrated in the drawing. The sub-division of the armature 37 substantially eliminates the induction of eddy currents in the armature and thus increases the efficiency of the motor. Further, by forming the armature of a set of super-imposed rings, the manufacture of the armature is simplified. The individual rings making up the armature 37 have a radial width greater than their axial thickness and accordingly can be readily punched from sheet material, whereas, the completed armature is of a greater axial thickness than radial width, and accordingly could not be punched in a single piece by ordinary manufacturing methods.

In the operation of the motor shown in Figs. 5 and 6 when the field coil 34 is energized with alternating current a rotating axis magnetic field is produced by the poles 27, 28 and 30, the polarity of this field rotating about the periphery of the field structure. This rotating field reacts with the armature 37 to produce a torque which starts and accelerates the motor. Thus at any given instant, the poles 27 and 30 produce opposite magnetic poles N:N and S:S in the adjacent portions of the armature 37. Due to the high hysteresis co-efficient of the armature metal and to the low de-magnetizing effect resulting from the above explained proportioning of the armature dimensions, this polarity of the armature persists, and immediately after the assumed instant the pole 28, which then has a polarity corresponding to the polarity of the pole 27 at the first assumed instant, attracts the portion S:S of the armature and repels the portion N:N thereof, thus producing torque which turns the armature 37 in the direction indicated by the arrow. The flux from the pole 28 is limited to a low value by the disposition of this pole within a recess of the pole 30, and accordingly this flux is incapable of changing the persisting magnetism of the armature. After the motor has accelerated to above approximately one-half synchronous speed, the alternating field of the poles 27 and 30 produces a positive torque which aids in the acceleration of the motor to the synchronous speed determined by the spacing of these poles. At synchronous speed, the magnetic pattern of the armature 37 becomes fixed and due to the high hysteresis co-efficient and the low self-demagnetizing effect of the armature, this permanent magnetism is of sufficient strength to produce a powerful torque.

Although I have disclosed ring armatures of rectangular cross section, it should be understood that various other cross sections may be used, so long as the greatest cross sectional dimension is less than the distance between the centers of adjacent field poles of opposite instantaneous polarity. Thus the armature may be of square or round section, although I have found round sections to be somewhat less desirable than rectangular sections because of manufacturing difficulties.

Although a distinct advantage is obtained whenever the maximum cross sectional dimension of my ring armature is less than the center distance between adjacent field poles of opposite instantaneous polarity, I find that in general the motor torque increases as the ratio of the opposite field pole distance to the maximum armature breadth increases. I accordingly prefer to employ an armature having a maximum cross sectional dimension which is very considerably less than the inter-polar distance, and as shown in the drawing, preferred embodiments of my invention incorporate armatures having a maximum breadth which is considerably less than one-half the distance between centers of adjacent opposite field poles.

The armature ring cross section should not be so far reduced that the maximum flux density produced therein by the field exceeds the saturation value for the armature metal employed. As a practical matter, most armature rings which have sufficient cross section for reasonable mechanical strength are large enough so that the metal is not saturated by the maximum field flux.

Typical examples of armature ring dimensions which gives satisfactorily low self-demagnetizing effects and yet avoid a condition of saturation of the armature metal are as follows. A 24 pole motor of the type shown in Figs. 1 and 2, provided with a field coil 11 comprising approximately 7000 turns of No. 40 enameled wire wound on a central core 12 which is .38 inches in diameter, energized with 110 volt, 60 cycle alternating current, the field casing section 10 being .04 inches thick, the field casing section 9 being .06 inches thick and the outside diameter of the field structure being 1.5 inches, may have an armature ring 14 formed of .7 per cent to 1.2 per cent carbon steel hardened, the inside diameter of the ring being 1.525 inches, its radial thickness $d$ being .065 inches and this axial thickness being .025 inches. A motor of the construction shown in Figs. 3 and 4, having a field coil 25 formed of approximately 5800 turns of No. 40 enameled wire wound on a central core which is .38 inches in diameter, energized with 110 volt, 60 cycle alternating current, the field casing section 16 having a thickness of .04 inches, the field casing section 20 having a thickness of .06 inches and the outside diameter of the field structure being 1½ inches may have an armature ring 22 formed of .7 per cent to 1.2 per cent carbon steel hardened, the inside diameter of the ring being 1.525 inches, its radial thickness $c$ being .065 inches and its axial thickness being .035 inches. A motor of the construction shown in Figs. 5 and 6, having a field coil comprising approximately 3800 turns of No. 37 enameled wire wound on a core 32 which is .625 inches in diameter, energized with 110 volt, 60 cycle alternating current, the field casing section 26 being .06 inches thick, the section 29 being .072 inches thick and the outside diameter of the field structure being 1.75 inches, may have an armature ring 37 formed of .7 per cent to .12 per cent carbon steel hardened, the inside diameter of the ring being 1.77 inches, its radial thickness being .055 inches and its axial thickness $f$ being .06 inches. The armature ring 37 thus described may be laminated, that is, may be formed of two, three or more superimposed rings, and the dimensions given are the overall dimensions of the composite ring so formed.

It should be understood that the specific constructional dimensions given are merely illustrative of typical embodiments of my invention, and that these dimensions are not to be construed as in any sense limiting. The dimensions and proportions of the armature rings as well as the high hysteresis co-efficient metals from which they are formed may be varied without departing from the scope of the invention as defined in the appended claims.

I claim:—

1. In an alternating current motor, a field member comprising a plurality of pole pieces, means for magnetizing different pole pieces of said field member to produce opposite instantaneous polarities therein and an armature adjacent said pole pieces comprising a ring of uniform magnetic reluctance composed of magnetic material having a high hysteresis coefficient, the maximum cross sectional dimension of said ring being less than the distance between the centers of adjacent field pole pieces of opposite instantaneous polarity.

2. In an alternating current motor, a field member comprising a plurality of pole pieces, means for magnetizing different pole pieces of said field member to produce opposite instantaneous polarities therein and an armature adjacent said pole pieces comprising a continuous ring of uniform magnetic reluctance composed of magnetic material having a high hysteresis co-efficient, the maximum cross sectional dimension of said ring being less than the distance between the centers of adjacent field pole pieces of opposite instantaneous polarity.

3. In an alternating current motor, a field member comprising a plurality of opposite pole pieces disposed substantially in circumferential alignment, means for magnetizing said opposite pole pieces with opposite instantaneous polarities and an armature rotatably disposed adjacent said pole pieces and comprising a continuous metallic ring of uniform magnetic reluctance composed of magnetic material having a high hysteresis coefficient, the maximum cross sectional dimension of said ring being less than the distance between the centers of adjacent opposite field pole pieces.

4. In an alternating current motor, a field member comprising a plurality of opposite pole pieces disposed substantially in circumferential alignment, means for magnetizing said opposite pole pieces with opposite instantaneous polarities and an armature rotatably disposed adjacent said pole pieces and comprising a metallic ring of uniform magnetic reluctance composed of magnetic material having a high hysteresis co-efficient, the maximum cross sectional dimension of said ring being less than one-half the distance between the centers of adjacent opposite field pole pieces.

5. In an alternating current motor, a field member comprising a plurality of opposite pole pieces disposed substantially in circumferential alignment, means for magnetizing said opposite pole piece with opposite instantaneous polarities and an armature rotatably disposed adjacent said pole pieces and comprising a ring of uniform magnetic reluctance composed of magnetic material having a high hysteresis co-efficient, the maximum cross sectional dimension of said ring being less than the distance between the centers of adjacent opposite field pole pieces.

6. In an alternating current motor, a field member comprising a plurality of opposite pole pieces disposed substantially in circumferential alignment, means for magnetizing said opposite pole pieces with opposite instantaneous polarities and an armature rotatably disposed adjacent said pole pieces and comprising a circumferentially continuous ring of uniform magnetic reluctance made up of a plurality of superimposed rings of magnetic material having a high hysteresis co-efficient, the maximum cross sectional dimension of said armature being less than the distance between the centers of adjacent opposite field pole pieces.

7. In an alternating current motor, a field member comprising a plurality of pole pieces, means for magnetizing different pole pieces of said field member to produce opposite instantaneous polarities therein and an armature adjacent said pole pieces comprising a laminated ring of uniform magnetic reluctance composed of magnetic material having a high hysteresis co-efficient, the maximum cross sectional dimension of said ring being less than the distance between the centers of adjacent field pole pieces of opposite instantaneous polarity.

8. In an alternating current motor, a field member comprising a plurality of pole pieces, means for magnetizing different pole pieces of said field member to produce opposite instantaneous polarities therein and an armature movably disposed adjacent said field pole pieces and comprising a ring of uniform magnetic reluctance composed of magnetic material of high hysteresis coefficient and having a cross sectional area sufficient to prevent the flux density produced in said armature by said magnetized field pole pieces from exceeding a condition of saturation of the armature metal, the maximum cross sectional dimension of said armature ring being less than the distance between the centers of adjacent field pole pieces of opposite instantaneous polarity.

9. In an alternating current motor, a field member comprising a plurality of opposite pole pieces disposed substantially in circumferential alignment, means for magnetizing said opposite pole pieces with opposite instantaneous polarities and an armature rotatably disposed adjacent said pole pieces and comprising a ring of uniform magnetic reluctance composed of magnetic metal having a high hysteresis co-efficient, the cross sectional area of said ring being in excess of that at which a condition of saturation of the armature metal would be produced by the maximum field flux, and the maximum cross sectional dimension of said armature being less than the distance between the centers of adjacent opposite field pole pieces.

ARTHUR WILLIAM HAYDON.